(12) United States Patent
Cline

(10) Patent No.: US 6,698,447 B1
(45) Date of Patent: Mar. 2, 2004

(54) HYDRANT MONUMENT

(76) Inventor: Darrell G. B. Cline, R.R. #2 Oro Station, Ontario (CA), L0L 2E0

( * ) Notice: Subject to any disclaimer, the term of this patent is extended or adjusted under 35 U.S.C. 154(b) by 69 days.

(21) Appl. No.: 09/714,257

(22) Filed: Nov. 17, 2000

(30) Foreign Application Priority Data

Nov. 19, 1999 (CA) .............................................. 2290187
Dec. 15, 1999 (CA) .............................................. 2292249

(51) Int. Cl.⁷ .............................................. E03B 9/02
(52) U.S. Cl. ...................................................... 137/272
(58) Field of Search ........................................ 137/272

(56) References Cited

U.S. PATENT DOCUMENTS

| | | | | |
|---|---|---|---|---|
| 2,424,269 A | * | 7/1947 | Doody ........................ | 137/272 |
| 3,748,795 A | | 7/1973 | Berntsen ........................ | 52/98 |
| 3,762,820 A | * | 10/1973 | Zoot et al. ............... | 356/141.1 |
| 3,939,861 A | | 2/1976 | Thompson .................. | 137/299 |
| 4,044,299 A | * | 8/1977 | Weber ........................ | 324/326 |
| 4,185,425 A | | 1/1980 | Merkel ........................ | 52/103 |
| 4,254,597 A | | 3/1981 | Feldman et al. ............... | 52/103 |
| 4,790,342 A | | 12/1988 | Segal ........................ | 137/68.1 |
| 5,148,641 A | | 9/1992 | Rushing et al. ............... | 52/103 |
| 5,211,685 A | | 5/1993 | Garcia ........................ | 137/295 |
| 5,214,757 A | * | 5/1993 | Mauney et al. ............. | 345/751 |

OTHER PUBLICATIONS

Results of USPTO database search dated Oct. 11, 1999.
Ontario Ministry of Natural Resources—Horizontal Control Monument Record—Monument No. 001673120, Oct. 27, 1999.
Geomatics Canada—Geodetic Survey Division—Vertical Control Monument Record Benchmark No. 71U541, Dec. 22, 1998.

* cited by examiner

*Primary Examiner*—Gerald A. Michalsky

(57) ABSTRACT

A survey monument comprises a conventional water hydrant with survey indicia or markings attached thereto. The survey indicia can be carried for example on a plate mounted on a flange bolt or attached to the operating nut of the hydrant. These survey monuments can be expanded upon and/or maintained in co-ordination with the expansion and maintenance of a municipality's water supply system. The hydrants can also be utilized in connection with any geographical information system to provide known reference points. The hydrants can also be utlized in connection with GPS devices to assist in localizing, initializing and calibrating the same.

16 Claims, 3 Drawing Sheets

HYDRANT MONUMENT

FIELD OF THE INVENTION

The present invention relates to monuments, including those used by surveyors, and to monuments or reference points that can be used in connection with, but not limited to, electronic positioning systems, such as Total Station Survey Systems, Global Positioning Systems (GPS) and Geographical Information Systems (GIS). The invention also relates generally to any form of geographical information system.

BACKGROUND OF THE INVENTION

There are several different types of surveys. For example, geodetic surveys cover a large geographic area and attempt to define the exact three-dimensional coordinates (northing, easting and elevation) of points on the earth's surface. Cadastral surveys are typically boundary surveys to define legal or political boundaries on plans.

Another type of survey is associated with a GIS ("Geographical Information System"), which ties assets to spatial data, and these are best derived from a universally acceptable coordinate system such as the GPS. GIS is a type of geographical information system and GIS is the industry acronym for a technology that integrates database information to coordinated maps. A GIS survey is the acquisition of data, which is linked (surveyed to a location) to a (specific) physical location on a map. A GIS creates "intelligent" supermaps for sophisticated planning and analysis. GPS surveys make this survey more economically viable but offer no quality assurance without being integrated or tied into physical monuments the location of which are known.

It is becoming increasingly desirable and attainable to integrate different types of surveys to a country state or provincial grid, or GPS to provide a unified co-ordinate system. However, the monuments used for geodetic and other types of surveys are expensive to place, difficult to maintain and not easily used for many practical survey applications.

Topographical and construction surveys are often tied to independently-adjusted networks of control points, and often to survey monuments used for either cadastral surveys or geodetic networks set by the state or province. In the case of geodetic monuments, they are often buried on right-of-way's to place them in inter-visible locations (so they can be viewed from one to the other). This makes them difficult and expensive to install and/or use.

Surveyors when carrying out a survey will typically mark certain physical locations for the survey, such as the corners of property, by these visible monuments. These monuments are typically secured to the ground or applied to an object, and which then mark a position on the surface of the earth. Early types of monuments were placed on natural objects such as trees, boulders or the like. However, as the need grew for more monuments, which would be more durable, more permanent types of monuments were developed. For example, it is known to provide a monument formed with a metal stake.

The stake can then be driven into a suitable substrate such as for example, a rock, or can be set in concrete in the ground. Survey indicia on a top plate or disc on top of the stake provide a reference as to the location of that monument.

The more monuments there are the easier it becomes to establish or re-establish coordinated points in a survey grid or network. It will be appreciated, however, that these types of monuments can be time consuming and costly to manufacture and locate, particularly when several are needed to be located within a given area. For example, monuments are required to be properly located when a new housing subdivision is being formed. These markers are needed so that property lines can be determined. However, it is sometimes difficult to insert or affix these known monuments in places where they are needed. During retracement surveys of a property, only the minimum number of monuments are typically replaced. The vast majority are removed during construction and this can result in disputes over property lines and involve having to perform retracement surveys.

Monuments, including those in towns or cities, are often set or positioned flush or nearly flush with the surrounding ground. Particularly in cold climates where there is a lot of snow and ice on the ground, this may make the locating of a monument by a surveyor particularly difficult, requiring digging through snow and ice to try to find the monument.

To assist in the location of survey monuments, it is known to include a magnet as part of the device. The magnet then may be detected, at least under some conditions, with the use of known types of magnetic detection instruments.

Being positioned flush or almost flush to the ground poses other problems, including the greater risk of being dislodged, displaced or vandalised.

Monuments can also be used in connection with electronic location systems such as the satellite based global positioning systems (GPS systems). Mobile location (e.g. GPS) devices used by individuals, either in their cars or elsewhere are becoming more common. Many of these devices are small hand held devices, which can be easily transported around by an individual. From time to time, to be able to verify that the device, such as a mobile GPS device, is providing accurate readings reference can be made to an existing survey monument. However, it is relatively difficult for the general public to know where to look for such a monument, when they decide they need to calibrate or localize their GPS device or other electronic location device to obtain a quality assurance reading.

Also, GPS is often more meaningful when tied to a local datum (i.e. the co-ordinates to which the region has been typically or traditionally utilizing). Quality assurance of GPS is provided by checking known points to verify a plurality of GPS indicated positions. To do datum transformations, known points must be utilized. Known points are the quickest way to initialize the GPS system and a minimum of four (with a known northing, easting and elevation), 3 dimensional points evenly distributed to the extent of a particular survey is recommended to calibrate or localize a GPS device (convert GPS measured coordinates into local grid co-ordinates) This initialization of a GPS device is a mathematical transformation of the global coordinates by a localization routine to the desired local coordinates. If a GPS device is activated over a monument with known coordinates it initializes much quicker and simultaneously provides the user with verification that it is functioning correctly. The user will feed in the known co-ordinates into the mobile device and then the device will run the localization routine and the device will then be initialized and ready for operation. With the use of,GPS devices expanding among members of the general public, most having no survey experience, there is a need to provide an easily accessible and recognizable monument that such individuals can use to assist them in initializing their mobile location or position devices.

SUMMARY OF THE INVENTION

In accordance with one aspect of the invention there is provided a water hydrant comprising: a vertically upstanding barrel section adapted for fluid communication with a water source; at least one water outlet adapted for fluid communication with the barrel section; and a survey element positioned on the water hydrant.

According to another aspect of the invention there is provided a hydrant comprising a vertically upstanding pipe section having an inlet and at least one outlet. The inlet and outlet are interconnected by an interior conduit. The inlet is adapted to be connected to a water source for fluid communication with the water source. The hydrant also comprises a survey reference element positioned on the hydrant.

According to another aspect of the invention there is provided a hydrant comprising a vertically upstanding pipe section having an inlet and at least one outlet. The inlet and outlet are interconnected by an interior conduit. The inlet is adapted to be connected to a water source for fluid communication with the water source. The hydrant also comprises a location indicator positioned on said water hydrant.

According to yet another aspect of the invention there is provided a water hydrant comprising a vertically upstanding barrel section adapted for fluid communication with a water source. The hydrant also comprises at least one water outlet adapted for fluid communication with the barrel section and a location indicator positioned on the water hydrant.

According to one aspect of the invention there is provided a method of surveying including the step of sighting with a survey instrument onto a hydrant. Preferably the sighting is onto a reference point on a hydrant, and more preferably, the reference point has survey indicia positioned on the hydrant.

According to another aspect of the invention there is provided a method of surveying including the step of sighting from a water hydrant onto a survey target.

Preferably the sighting is from a reference point onto a hydrant. More preferably the reference point has survey indicia positioned on the hydrant.

According to another aspect of the invention there is provided a network of survey monuments comprising a plurality of survey monuments, two or more of said plurality of survey monuments comprising hydrant monuments each hydrant monument comprising: a vertically upstanding barrel section adapted for fluid communication with a water source; at least one water outlet adapted for fluid communication with said barrel section.

Preferably said two or more hydrant monuments comprise survey indicia positioned on said hydrant monuments.

According to another aspect of the invention there is provided a Geographical Information System having a plurality of control points, at least one of said control points comprising a hydrant monument having a vertically upstanding barrel section adapted for fluid communication with a water source; at least one water outlet adapted for fluid communication with said barrel section. Preferably the hydrant has survey indicia positioned thereon.

According to another aspect of the invention there is provided a method of using hydrant to reference the location of a mobile location device, said method including the steps of:

(a) placing said mobile location device proximate a hydrant monument; said hydrant monument having a vertically upstanding barrel section adapted for fluid communication with a water source; at least one water outlet adapted for fluid communication with said barrel section; and (b) entering known co-ordinates associated with the location of the hydrant monument into the mobile location device;

(c) after steps (a) and (b), running a reference routine built into said mobile location device.

Preferably said reference routine is one of a localization routine, a calibration routine and initialization routine.

According to another aspect of the invention there is provided a water hydrant comprising:

(a) a vertically upstanding barrel section adapted for fluid communication with a water source;

(b) at least one water outlet adapted for fluid communication with said barrel section; and (c) a survey reference point on said water hydrant.

According to another aspect of the invention there is provided a network of survey monuments comprising a plurality of survey monuments, two or more of said plurality of survey comprising hydrant monuments each comprising: a vertically upstanding barrel section adapted for fluid communication with a water source; at least one water outlet adapted for fluid communication with said barrel section. Preferably each said hydrant has a survey reference point thereon.

According to another aspect of the invention there is provided a method of gathering geographical information for a geographical information system with the use of a positioning device, using a hydrant as a reference location for said system, said method including the steps of:

(a) placing said positioning device proximate a hydrant monument;

(b) entering the known position of hydrant monument into the positioning device.

According to another aspect of the invention there is provided a geographical information system comprising at least one hydrant used as a reference point.

According to another aspect of the invention there is provided a computer program adapted for generating a visual representation of a section of terrain in the real world, said representation including indicators for a series of computer generated fire hydrants corresponding to fire hydrants in said section of terrain, said fire hydrants in said section of terrain having known co-ordinates for inputting into said computer program as location control points for said computer generated representation, whereby when said known coordinates corresponding to said series of fire hydrants in said section of terrain are inputted to said computer program as location control points for said computer program will generate a representation having all features-shown in the representation in their true relative positions.

According to another aspect of the invention there is provided a computer program for generating a map or model having a plurality of location control points corresponding to fire hydrants in the real world, each of said fire hydrants having co-ordinates in the real world stored in said computer program.

BRIEF DESCRIPTION OF THE DRAWINGS

In drawings which illustrate the preferred embodiments of the invention.

DETAILED DESCRIPTION OF THE PREFERRED EMBODIMENTS

Figure 1:
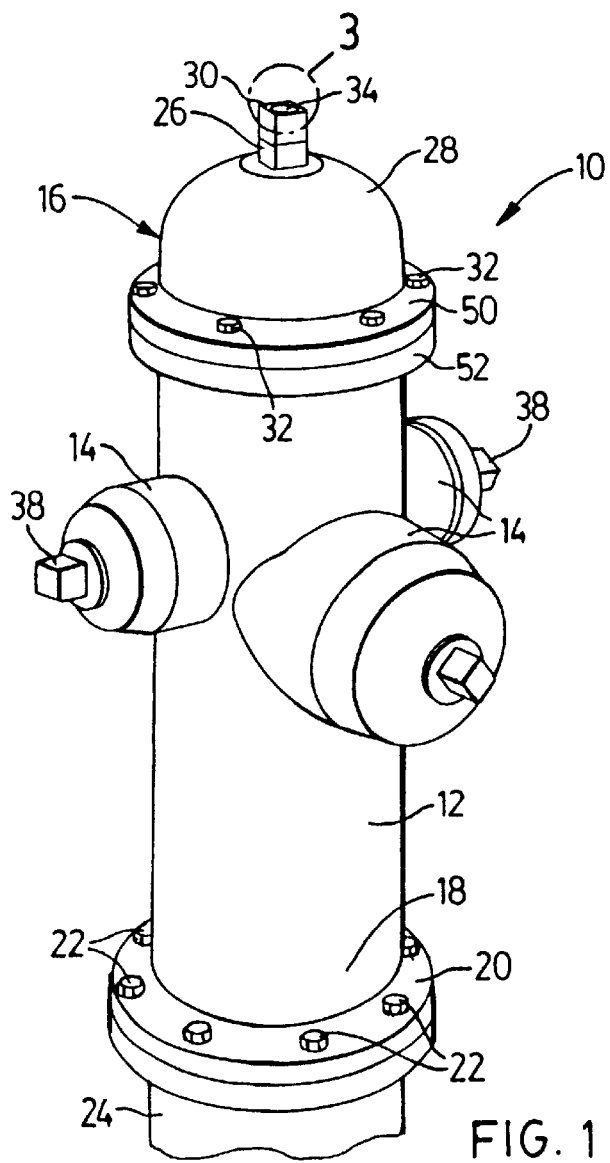
FIG. 1 is a front perspective view of a hydrant monument in accordance with a first embodiment of the invention.
Figure 2:
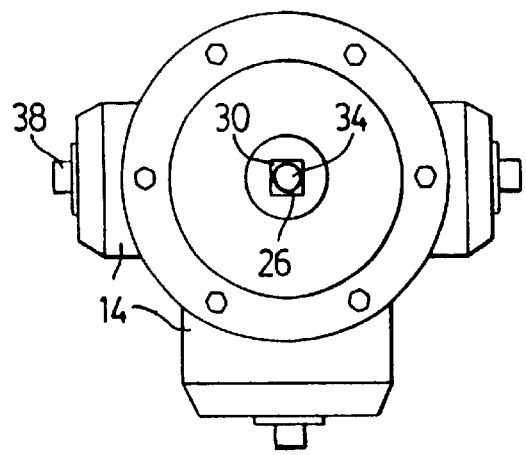
FIG. 2 is a plan view of the hydrant monument of FIG. 1.
Figure 3:
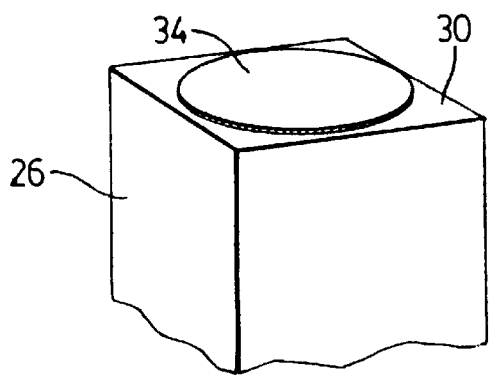
FIG. 3 is an enlarged view of part 3 of the hydrant monument of FIGS. 1 and 2.
Figure 3A:
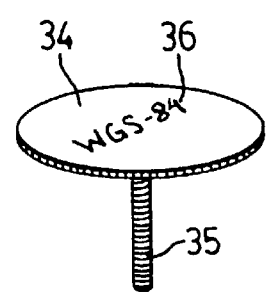
FIG. 3A is a perspective view of a part shown in FIG. 3.

With reference to FIGS. 1, 2,3 and 3A, a hydrant monument in accordance with a preferred embodiment of the invention is illustrated and generally designated 10. The hydrant monument 10 comprises a conventional water hydrant, such as a fire hydrant. As is known, fire hydrants are provided in most, if not all areas where there is an established municipal or community water system. Fire hydrants are typically spread throughout the community at spaced but not infrequent intervals, and are interconnected to the community's water mains. Fire hydrants are generally located in highly visible locations and there are typically legal restrictions prohibiting the interference therewith (e.g. parking restrictions in the vicinity of a fire hydrant). Fire hydrant 10 in the preferred embodiment disclosed herein, is preferably coloured at least partly, in a bright or otherwise noticeable colour such as red, yellow or orange to make it more easily visible. Monument hydrant 10 may be representative of several, if not many of the fire hydrants in a particular community, or section of a community, or subdivision or part thereof.

Hydrant monument 10 is formed in part in a conventional manner and will have a main barrel section (a vertical hollow tube section) 12, having one or more water outlets 14 projecting from the side of barrel section 12 proximate the top 16 of barrel section 12. Fire hoses (not shown) can be connected to each of water outlets 14 in a conventional manner. At the bottom 16 of barrel section 12 is a circular flange 20, with a number of bolts 22 protruding there through. Bolts 22 interconnect flange 20 and thus barrel section 12, with piping underground which is in fluid communication with the water main (not shown) also in one of the conventional configurations.

At the upper end of barrel section 12 is a bell shaped barrel top 16 which has a lower flange 50. Lower flange 50 is secured to upper flange 52 of barrel section 12 by flange bolts 32.

A top actuating or operating nut 26 protrudes from barrel top 16, extending vertically upwards from the top of barrel top 16. Nut 26 is connected to a valve mechanism (not shown) within barrel section 12 of hydrant monument 10 in a conventional manner. Rotation of nut 26 moves the valve mechanism between an open position and a closed position, to permit the flow of water through the barrel section 12 to the one or more of the water outlets 14. A separate valve (not shown) associated with the water outlets 14 may be operated by rotation of a nut 38, to provide for water flow from a particular outlet 14.

Provided on the top face 30 of actuating nut 26 is a survey element 34, in this embodiment consisting of a monument plate. Survey element 34 bears survey indicia 36, such as for example, "DATUM WGS-84". Plate 34 is formed with a threaded shaft 35 which is received in a threaded hole in the top surface of actuating nut. Threaded holes and screws in the top of the actuating nut are known, as the hole provides a place in which a lubricant, such as oil, for the valve mechanism can be inserted. Thus, the threaded hole can be capped in hydrant 10 with a monument plate 34.

The survey or other geographical location indicia (FIG. 3) will typically identify the precise location at the reference point. Depending upon the type of survey the monument is being used in, these indicia may relate to positions of longitude and latitude, and may additionally relate to vertical position (i.e. position above or below sea level). This survey indicia information can be provided in a Geographical Information System (GIS) provided to users, and would link the indicia to the positions of longitude, latitude and possibly elevation.

Other types of survey or geographical indicia might be way of example, a numeric or alphanumeric system devised to uniquely identify and provide survey or geographical datum for each hydrant monument.

Alternately, the survey indicia may simply provide a means of identifying a specific hydrant monument, and could be any type of indicator. Alternatively, one could even provide some kind of signage attached to or located proximate a hydrant monument providing some sort of hydrant identifier.

It will be appreciated that, the hydrant monument 10, and the survey indicia carried thereon, are relatively easy to locate, even when the climate conditions are adverse.

Figure 4:
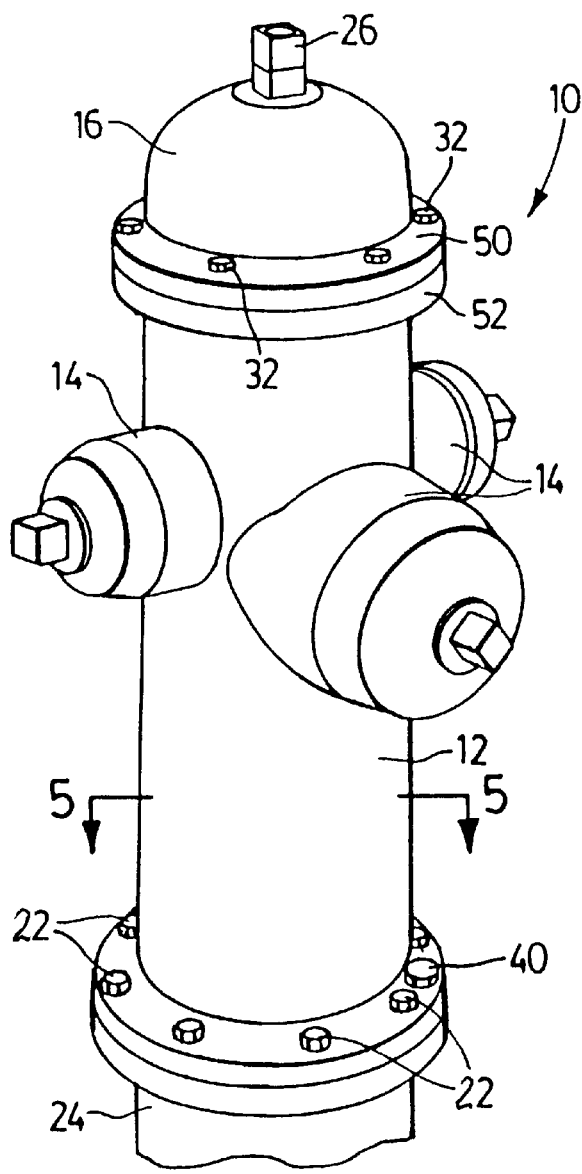
FIG. 4 is a front perspective view of a hydrant monument in accordance with a second embodiment of the invention.
Figure 4A:
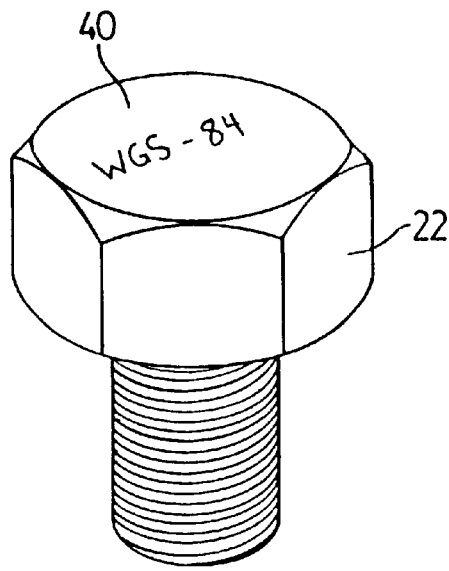
FIG. 4A is an enlarged perspective view of a part of the hydrant of FIG. 4.
Figure 5:
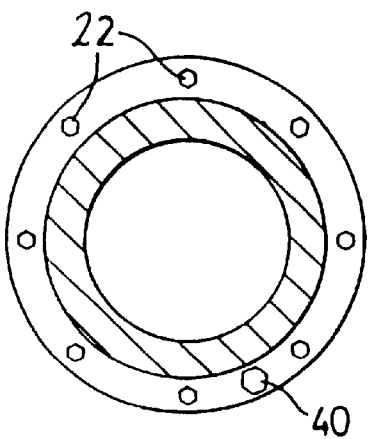
FIG. 5 is a plan view of the hydrant monument of FIG. 4.
Figure 6:
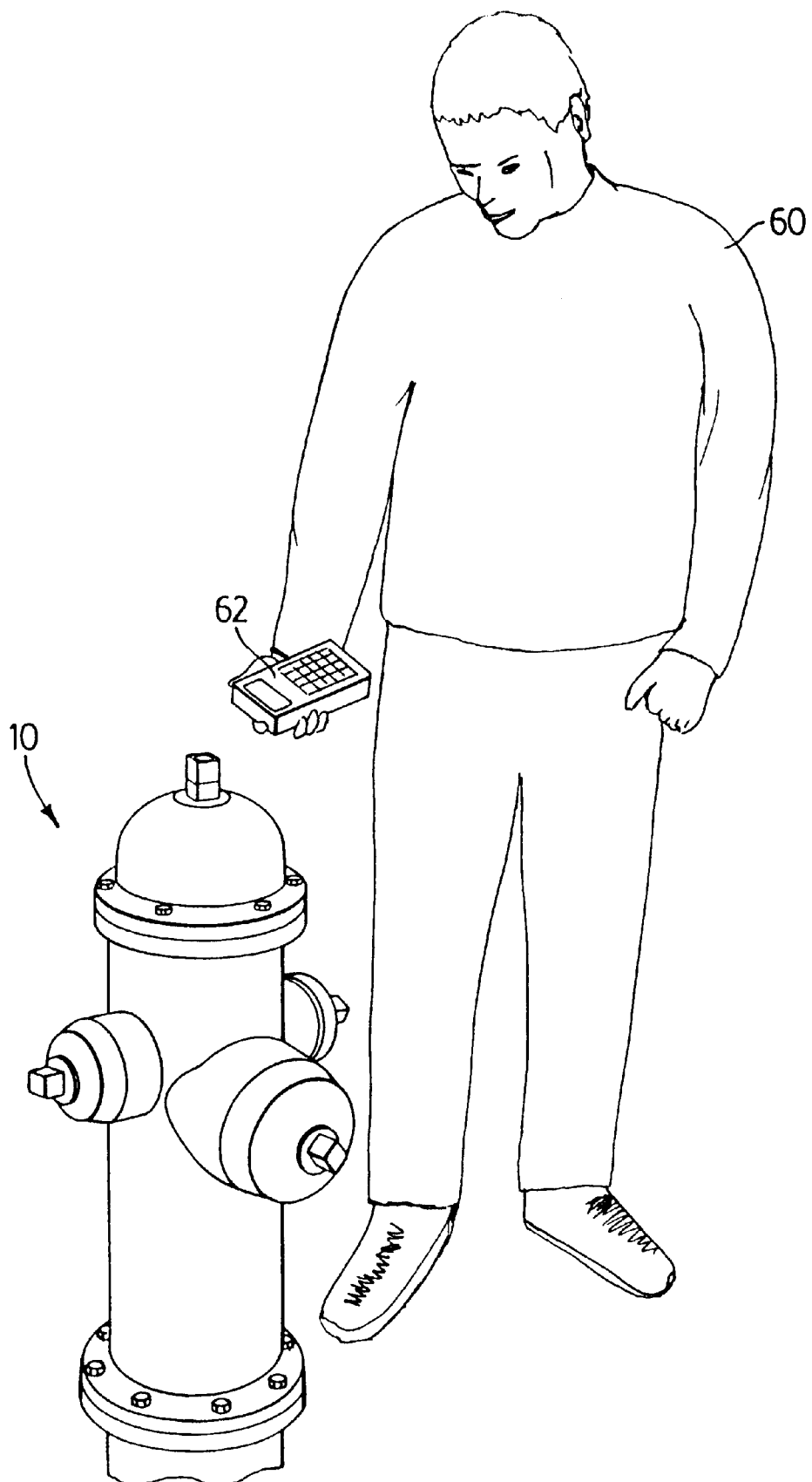
FIG. 6 is a schematic view of a person utilizing a hand-held GPS device in combination with a hydrant monument in accordance with the present invention.

In one alternate embodiment shown in FIGS. 4 to 6, the survey indicia are provided on a plate 40, affixed to the top of a flange bolt 22 on bottom flange 20. The plate 40 can be secured by any known suitable means of attachment, such as welding, gluing etc. Even if the survey indicia are covered, location of the hydrant monument 12 is relatively easy. Alternatively the survey monument plate 40 can be placed on top of a bolt 32 securing flange 50 to flange 52. In another embodiment, the survey indicia could be contained on the top surface of the bolt 22 or 32 itself, by engraving or other means. The indicia could also be placed in another convenient place and/or in another convenient manner.

In another alternate embodiment, the hydrant itself will have no specific, survey indicia of any kind, or any specific monument plate or the like added to it. Rather, a common feature or part of the hydrant may serve as the reference point to be used by surveyors when using the hydrant as a survey monument, such as for example, the top surface of the actuating or operating nut 26. In such a case, the surveyor can identify the specific hydrant by other means, such as for example, a street map which would identify the specific hydrant at a specific location, or use of a GPS mobile location device in conjunction with some kind of reference map or database. Once the specific hydrant has been identified, a database (GIS) or other record-maintaining device can be employed by the surveyor to determine the specific location or positioning of that hydrant.

In some types of geographical location systems, the position of the hydrant per se (ie. the position of any part of the hydrant) may provide an accurate enough location for the purposes of that system.

Ensuring that the reference point is consistently and properly located might be achieved for example, by improving the manufacturing tolerances of the hydrant as a whole, or for example, the top operating nut in particular. (Or enhancement for this purpose.)

The hydrant monuments of the present invention can be employed by surveyors to provide both horizontal (longitude and latitude) positioning and vertical positioning. No changes are required to normal survey techniques, and surveyors can sight from the specific location on the hydrant where the indicia are located (e.g. the operating nut, flange bolt etc.) or can sight on to the reference point on the hydrant. A surveyor in performing a survey, may mount a conventional survey instrument such as a transit or a Total Station or GPS unit directly to the top of the hydrant monument 10. Likewise, a surveyor may wish to sight from a survey instrument on to target such as a rod, prism or other targeting device or GPS base station or other such survey device positioned on top of the reference point.

A hydrant monument has several advantages over conventional types of survey monuments. For example, it is easier to use in all climate conditions. It can be located relatively easy. The planning of laying out of the monuments can be integrated with the planning of the areas water system. Thus, as a water system expands or is refurbished in an area, the survey, monuments can expand with the water system. As fire hydrants are generally maintained on a fairly regular basis, an opportunity for a status or condition review can readily take place at the same time. This invention provides an opportunity to build in a universally accepted standard for survey monuments. This will ensure more regular and cost effective maintenance of the monuments. Furthermore, the cost of producing monuments should be reduced compared to the conventional process of making a separate device.

With respect to Geographical Information Systems, by use of hydrant monuments, a GIS can readily created that is easily used and understood. In GIS, all types of assets can be tied to or associated with a location. Hydrant monuments can serve as control points for the GIS, and since they are easily recognizable, it makes it easier for those people who are not experts in surveying, to gather the relevant data for the GIS and then tie that data to a specific location.

With reference to FIG. 6, it will be noted that an individual 22 will be readily able to locate and then utilize a hydrant monument 10 to verify the location readout provided from a GPS device 62, by cross referencing the hydrant monument's location with the readout from the mobile positioning device 62.

Finally, by developing hydrant monuments with the expansion of or maintenance of a municipality's water supply system, a more uniform system of laying out survey monuments can be established. A network of monuments can thus be planned in co-ordination with the development of the water system. A system of equilateral triangles with monuments at the vertices is the strongest mathematical model to be applied to survey networks. Hydrants are so densely populated as to naturally conform to this model of a network of monuments. Very little planning is needed to adjust the placement of hydrants to a survey grid.

The increased density of hydrant monuments also provides for blunder detection by its redundancy. The physical linkage of hydrants via the interconnecting water mains makes any shifting of locations impossible and provides additional strength to the configuration.

As discussed above, GPS surveys make a GIS survey more economically viable but there is not a high degree of quality assurance without the GPS survey being integrated or tied into a known physical monument. This new hydrant monument, when linked in as part of a GPS survey, provides a fast, reasonably economic way of providing the necessary quality assurance for a Geographical Information System. Indeed, one or more hydrant monuments can be used as a reference point in any geographical information system which ties information to location.

There are various types of functions a user of a mobile device such as a GPS device can carry out using a hydrant as a reference, including initialization, localization and calibration of the device. These devices have built in computer routines, which when run, enable the device to perform these functions.

Initialization is the routine or function used to calculate or determine the position of the GPS device. When initialization is done at a position with co-ordinates already known to the user, the GPS device can calculate its position quicker and with fewer satellites. This routine can be run on the device each time a known point is available.

Calibration is the routine or function used to calculate the best-fit position of the GPS device to a number of known positions. When calibrated on a well-configured network of known positions the GPS device gives more precise and accurate positions. This can be done with a recommended minimum of four known 3 dimensional points(dependent on accuracy requirements) whereby a known position is entered into the device and the routine is run, to check and if necessary adjust the measurement and corresponding readout of the device.

Localization is the routine used to transform the GPS device's 3 dimensional co-ordinates (based on a global datum) into a local system of co-ordinates (based on another datum). This can be done with a minimum 3 known points (dependent on accuracy requirements).

With respect to the initialization of mobile electronic location devices, such as mobile GPS devices, by placing such a device at a hydrant monument, entering the known coordinates of that hydrant monument into the device, then running the initialization routine built into the device, the device can be quickly and readily initialized. If necessary, the user may be provided with a table, database or the like that provides a concordance between the survey indicia that can be found on the hydrant monument and the location co-ordinates understood and used by the mobile device.

The hydrant monument can be also be used in connection with the calibration or localization of the GPS device, using for example, several hydrants having known positions, which are then entered into the device and the corresponding calibration or localization routine is run on the device.

Computer applications and programs are being widely used in connection with surveying and mapping generally, and for district, city and town planning and geographical information systems generally. They are being used to create digital maps as well as 3-dimensional models of space, particularly for maps or 3-D models of real world terrain. Some commercially available computer aided drafting programs are well adapted to be used for such tasks, and examples of such programs include a series of applications by Autodesk including AUTOCAD MAP, AUTOCAD LAND DEVELOPMENT DESKTOP R2, AUTODESK SURVEY R2 AND AUTODESK CAD OVERLAY 2000. Other such products include MULTRIC by Mentor Software Inc. and ARCINFO 8 by ESRI.

One way in which some of these computer programs are used to generate digital maps, is by scanning into a computer program an existing map, satellite imagery, and/or aerial photography and integrating any combination of the foregoing to produce a computer generated image existing map. However, usually when this is done, the relative positions of features on such a digital map generated by the program may not properly reflect and are distorted from their true relative positions in the real world. Accordingly, a technique known as rubbersheeting can be used to more accurately integrate the scanned entities. Rubbersheeting can be generally described as a process by which one data set is beneficially distorted to meet specific requirements and can be used for example, to rubber sheet one map (such as a scanned map) to a controlled set of data or a controlled base map. To carry out the process of rubbersheeting, control points with known locations in the real world and relative to each other are needed to be imported into the digitized map, so that the features appearing in the digitized map or model can be properly positioned in 2 or 3 dimensions relative to each other.

By way of further background, the use of the Multric application is described in company literature as follows:

"Using Multric is essentially a two step process. First control points must be digitized. That is, you must provide Multric with information as to the nature and degree of the distortion the rubber sheeting process is to apply to the data which is selected in the second step. This is accomplished by digitizing a set of control points. That is, instructions to Multric in the form of "I want this point to end up there!" Second, the distortion defined by the control points needs to be a applied to a selected set of data in your drawing. To accomplish this, Multric computes a transformation and applies it to all entities in a standard AutoCAD selection set provided by the operator. Multric uses a TIN (triangulated irregular network), which allows every control point picked to be honored exactly. The TIN creates a different transformation for each triangular face of the surface in order to model the data. Triangulation adjustment has been shown to be the best technique for rubber sheeting unless the specific situation involves a problem which can be accurately modeled mathematically. Scanning paper maps does not lend itself well to a specific mathematical model as there are too many variables involved; paper map inaccuracies, paper shrinkage, optical distortions in the scanning process, etc.

There is no limit to the number of control points which can be used. Multric honors every point regardless. Once the control points are triangulated, Multric develops a mathematical model of the distortion for each region enclosed within each triangle. Thus, the end points of each line segment (i.e. a vertex in the case of a polyline) are modified by a transformation derived from the three control points which define the triangle in which the point being adjusted resides.

What is Rubber Sheeting?

Rubber sheeting refers to a process by which one data set is beneficially distorted to meet specific requirements. In Multric, the data which is to be distorted, i.e. to be edited, is referred to as the edit data set. The beneficial distortion desired is defined by associating specific locations in the edit data set with points in a second data set. The second data set is referred to as the reference data set. That is, the data set to which the edit data set is to be referenced. For example, when rubber sheeting a parcel map to fit into a controlled base map, the parcel map is referred to as the edit data set and the base map is referred to as the reference data set."

Conveniently, maps scanned from satellite imagery, and/or aerial photographs scanned into computers for generating digital maps sometimes often identify fire hydrants. Also, the location of hydrants relative to features identified on the map can be often be easily ascertained (eg. one can identify that the fire hydrant is located 2 feet from the corner of a particular building that is shown on a map). Hydrants that are survey monuments would provide for ideal control points in generating digitized maps or 3-D models since their positions in the real world and relative to each other would be already known.

By way of further explanation, if fire hydrants are used as location control points for computer generated maps and models, then one can identify the specific locations or co-ordinates of the fire hydrants in the real world, if it is not already known by virtue of already being a survey monument. Once the co-ordinates are known, the location/co-ordinate information of the hydrants can be inputted into the program providing and creating the digital map or model. These programs then use the actual hydrant location information in the real world to create a mapped or modeled representation of the real world that properly represents true relative positions of all features in the map or model.

The embodiments of the invention in which an exclusive property of privilege is claimed are defined as follows:

1. A water hydrant comprising:
    (a) a vertically upstanding barrel section adapted for fluid communication with a water source;
    (b) at least one water outlet adapted for fluid communication with said barrel section; and
    (c) a survey element positioned on said water hydrant, said survey element comprising survey indicia, said survey indicia being related to information defining the location of a reference point on said hydrant in two dimensional space.

2. A water hydrant as claimed in claim 1 wherein said survey element has said survey indicia visibly marked thereon.

3. A water hydrant as claimed in claimed in claim 2 wherein hydrant further comprises an operating nut interconnected to a valve mans, for controlling the flow of water in said barrel section, and wherein said survey indicia are located on a visible surface of said operating nut.

4. A water hydrant as claimed in claim 2 wherein said survey element comprises a monument plate and said survey indicia are located on said monument plate which is visibly mounted on said hydrant.

5. A water hydrant as claimed in claim 4, wherein said barrel section has a peripheral flange circumscribing a lower portion of said barrel section, said flange having flange bolts for interconnecting said barrel section to a pipe carrying water from a water main, to provide for fluid communication between said pipe and said barrel section, and wherein said monument plate is mounted on to said flange.

6. A water hydrant as claimed in claim 5 wherein said monument plate is interconnected to one of said flange bolts.

7. A hydrant as claimed in claim 1 wherein said information defines said location in three-dimensional space.

8. A hydrant as claimed in claim 1 wherein said reference point is on said survey element.

9. A hydrant comprising:
    a vertically upstanding pipe section having an inlet and at least one outlet, said inlet and outlet interconnected by an interior conduit, said inlet being adapted to be connected to a water source for fluid communication with said water source;
    a survey element positioned on said water hydrant, said survey element comprising survey indicia, said survey indicia being related to information defining the location of a reference point on said hydrant in two dimensional space.

10. A hydrant as claimed in claim 9 wherein said information defines said location in three-dimensional space.

11. A water hydrant as claimed in claimed in claim 10 wherein hydrant comprises an operating nut interconnected to a valve means, for controlling the flow of water in said pipe section, and wherein said survey element is secured to a surface of said operating nut.

12. A hydrant as claimed in claim 9 wherein said reference point is on said survey element.

13. A hydrant as claimed in claim 12 wherein said hydrant is in fluid communication with said water source.

14. A hydrant as claimed in claim 13 wherein said water source is part of a multi-hydrant water distribution system.

15. A water hydrant as claimed in claimed in claim 14 wherein hydrant further comprises an operating nut interconnected to a valve means, for controlling the flow of water in said pipe section, and wherein said survey indicia are located on a surface of said operating nut.

16. A water hydrant as claimed in claim 15 wherein said survey indicia are located on a monument plate mounted on said hydrant.

\* \* \* \* \*

UNITED STATES PATENT AND TRADEMARK OFFICE
CERTIFICATE OF CORRECTION

PATENT NO.     : 6,698,447 B1
DATED          : March 2, 2004
INVENTOR(S)    : Cline, Darrell G.B.

It is certified that error appears in the above-identified patent and that said Letters Patent is hereby corrected as shown below:

Column 10,
Line 35, replace "connected to a valve mans," with -- connected to a valve means, --.

Signed and Sealed this

Fifteenth Day of June, 2004

JON W. DUDAS
*Acting Director of the United States Patent and Trademark Office*